US009864368B2

(12) United States Patent
Krupansky et al.

(10) Patent No.: US 9,864,368 B2
(45) Date of Patent: Jan. 9, 2018

(54) METHODS AND APPARATUS FOR GLOBAL OPTIMIZATION OF VERTICAL TRAJECTORY FOR AN AIR ROUTE

(71) Applicant: HONEYWELL INTERNATIONAL SARL, Rolle (CH)

(72) Inventors: Petr Krupansky, Veverska Bityska (CZ); Jaroslav Jonak, Brno (CZ); Vitezslav Cip, Zubri (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/017,782

(22) Filed: Feb. 8, 2016

(65) Prior Publication Data
US 2017/0227955 A1    Aug. 10, 2017

(51) Int. Cl.
| | |
|---|---|
| *G05D 1/00* | (2006.01) |
| *B64C 19/00* | (2006.01) |
| *G01C 21/20* | (2006.01) |
| *G05D 1/06* | (2006.01) |
| *G08G 5/00* | (2006.01) |

(52) U.S. Cl.
CPC .......... *G05D 1/0005* (2013.01); *B64C 19/00* (2013.01); *G01C 21/20* (2013.01); *G05D 1/0607* (2013.01); *G08G 5/003* (2013.01); *G08G 5/0021* (2013.01); *G08G 5/0034* (2013.01)

(58) Field of Classification Search
CPC ............ G05D 1/00; B64C 19/00; G08G 5/00
USPC ................................. 701/5, 14; 244/180, 186
See application file for complete search history.

(56) References Cited

U.S. PATENT DOCUMENTS

| | | | | |
|---|---|---|---|---|
| 5,574,467 A | * | 11/1996 | Saunders | .................. G01S 1/46 342/398 |
| 5,574,647 A | | 11/1996 | Liden | |
| 8,014,907 B2 | * | 9/2011 | Coulmeau | ............ G08G 5/0013 244/186 |
| 8,423,272 B2 | | 4/2013 | Judd et al. | |

(Continued)

FOREIGN PATENT DOCUMENTS

| | | |
|---|---|---|
| EP | 2631732 A1 | 8/2013 |
| EP | 2690613 A2 | 1/2014 |

OTHER PUBLICATIONS

Amendment 45 to the International Standards Rules of the Air (Annex 2 to the Convention on International Civil Aviation) Tenth Edition—Jul. 2005.

(Continued)

*Primary Examiner* — Tan Q Nguyen
(74) *Attorney, Agent, or Firm* — Lorenz & Kopf, LLP

(57) ABSTRACT

A method for calculating vertical trajectory values is provided. The method obtains aircraft performance data for a particular aircraft and atmospheric condition data associated with an air route; calculates a cost-efficient vertical trajectory for the air route, based on the aircraft performance data and the atmospheric condition data, wherein the cost-efficient vertical trajectory comprises a plurality of altitude values for minimizing cost for the particular aircraft during travel of the air route; obtains an altitude consistency threshold; and adjusts the cost-efficient vertical trajectory using the altitude consistency parameter, to create an optimized vertical trajectory for the aircraft route.

15 Claims, 9 Drawing Sheets

(56) References Cited

U.S. PATENT DOCUMENTS

| | | | |
|---|---|---|---|
| 8,600,588 B2* | 12/2013 | Del Amo Blanco | G08G 5/0034 701/14 |
| 8,892,275 B2 | 11/2014 | Constans et al. | |
| 9,290,262 B2* | 3/2016 | Laso-Leon | G05D 1/0005 |
| 9,330,573 B2 | 5/2016 | Brandao et al. | |
| 2004/0078136 A1 | 4/2004 | Cornell et al. | |
| 2012/0265374 A1 | 10/2012 | Yochum | |
| 2014/0244077 A1 | 8/2014 | Laso-Leon et al. | |
| 2015/0323933 A1 | 11/2015 | Darbois | |
| 2016/0019796 A1* | 1/2016 | Agrawal | G08G 5/0021 701/14 |
| 2016/0125744 A1 | 5/2016 | Shamasundar et al. | |

OTHER PUBLICATIONS

Murrieta-Mendoza, A.; Flight Altitude Optimization Using Genetic Algorithms Considering Climb and Descent Costs in Cruise with Flight Plan Information; The Research Laboratory in Active Controls, Avionics and Aeroservoelasticity (Larcase) 2015.

Ng, H.K et al.; A Practical Approach for Optimizing Aircraft Trajectories in Winds; University of California, NASA Ames Research Center Jun. 21, 2011.

Extended EP Search Report for Application No. 17151890.5-1557 dated May 7, 2017.

* cited by examiner

METHODS AND APPARATUS FOR GLOBAL OPTIMIZATION OF VERTICAL TRAJECTORY FOR AN AIR ROUTE

TECHNICAL FIELD

Embodiments of the subject matter described herein relate generally to calculating vertical trajectory for a route flown by an aircraft. More particularly, embodiments of the subject matter relate to determining a practical and cost-efficient vertical trajectory applicable to a route.

BACKGROUND

A vertical trajectory may be defined as a vertical profile of flight. A vertical trajectory of an aircraft, for a particular air route, is generally created by a flight management system (FMS) onboard an aircraft. Passenger air travel and air transport of goods are becoming progressively more costly, due to the rising cost of fuel and other factors. The cost of a particular flight (e.g. fuel consumption, flight time) depends on altitude, weight, aerodynamic performance of aircraft, speed of aircraft and environmental conditions (wind, temperature).

Accordingly, it is desirable to determine practically-implemented methods for reducing the cost of a particular flight. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for calculating vertical trajectory values. The method obtains aircraft performance data for a particular aircraft and atmospheric condition data associated with an air route; calculates a cost-efficient vertical trajectory for the air route, based on the aircraft performance data and the atmospheric condition data, wherein the cost-efficient vertical trajectory comprises a plurality of altitude values for minimizing cost for the particular aircraft during travel of the air route; obtains an altitude consistency threshold; and adjusts the cost-efficient vertical trajectory using the altitude consistency parameter, to create an optimized vertical trajectory for the aircraft route.

Some embodiments provide a system for calculating vertical trajectory values. The system includes: a system memory element; a communication device, configured to receive atmospheric condition data associated with an air route; and at least one processor communicatively coupled to the system memory element and the communication device, the at least one processor configured to: calculate a cost-efficient vertical trajectory for the air route, based on the aircraft performance data and the atmospheric condition data, wherein the cost-efficient vertical trajectory comprises a plurality of altitude values for minimizing cost for the particular aircraft during travel of the air route; and adjust the cost-efficient vertical trajectory using an altitude consistency threshold, to generate an optimized vertical trajectory for the aircraft route.

Some embodiments provide a non-transitory, computer-readable medium containing instructions thereon, which, when executed by a processor, perform a method. The method identifies distance points throughout an air route; calculates a cost-efficient altitude for each of the distance points to determine a plurality of cost-efficient altitudes, wherein the plurality of cost-efficient altitudes is applicable to a particular aircraft traveling the air route; determines whether each of the plurality of cost-efficient altitudes complies with an altitude consistency threshold; and when one of the plurality of cost-efficient altitudes does not comply with the altitude consistency threshold, shifts the one of the plurality of cost-efficient altitudes to comply with the altitude consistency threshold.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure presents methods and apparatus for calculating and providing an optimized vertical trajectory for an air route. An air route may be defined as a flight path from a first defined location to a second defined location, and a vertical trajectory for an air route includes one or more altitude values at which an aircraft is instructed to fly while traveling the air route. In the context of the present disclosure, the vertical trajectory is "optimized" by determining cost-efficient, yet practically-implemented, altitude values for the particular air route. Exemplary embodiments of the present disclosure first calculate a part of vertical trajectory which consumes a low level of fuel, based on an aircraft data model and atmospheric conditions for the air route, and then optimize the calculated vertical trajectory by implementing conditions associated with practical flying principles. Examples of such conditions may include implementing an altitude consistency threshold (e.g., maintaining an altitude level for a particular period of time, a particular distance value, transition to another airspace sector, transition to another air navigation service provider (ANSP), or the like).

Figure 1:
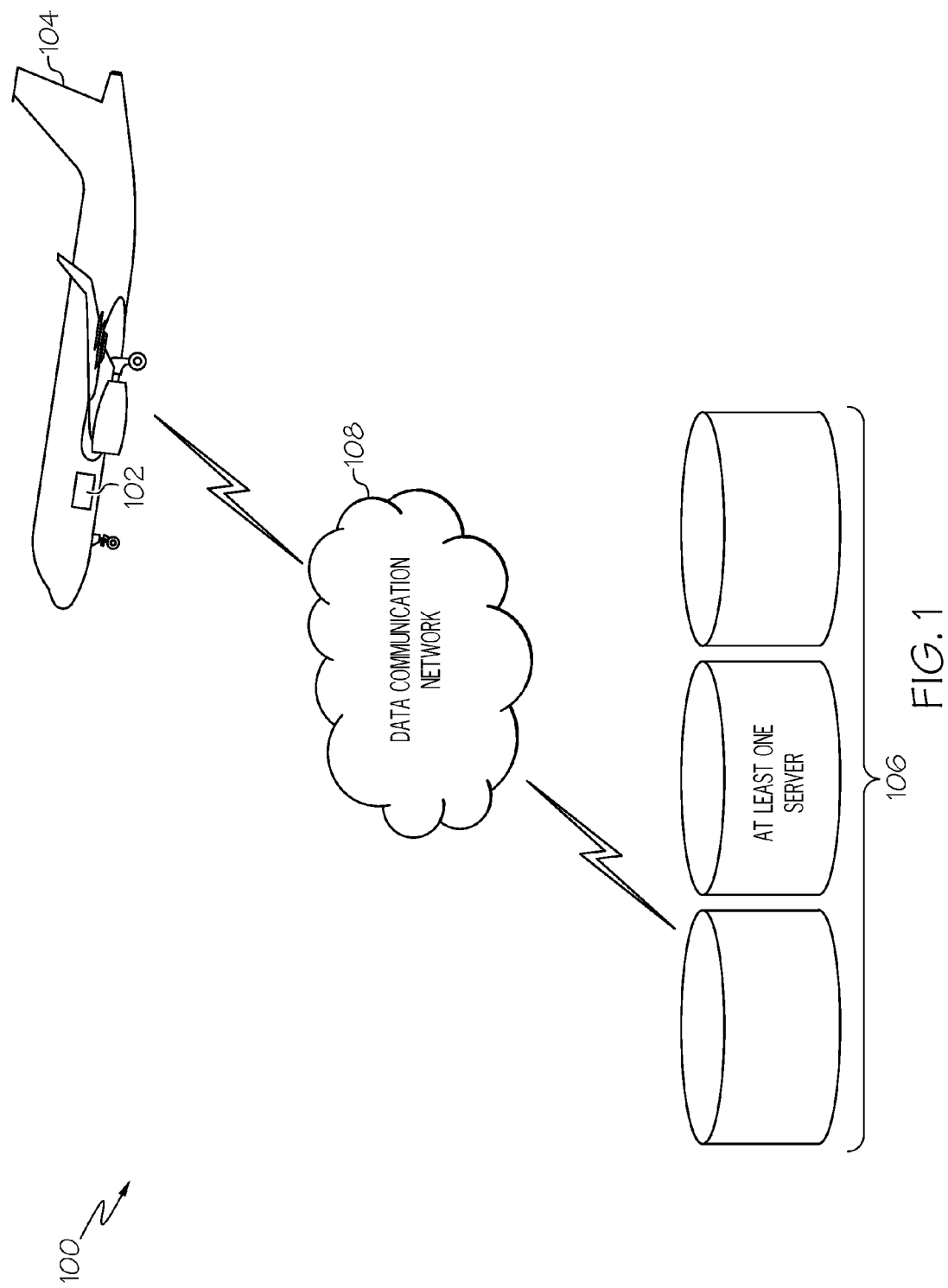
FIG. 1 is a diagram of a vertical trajectory optimization system, in accordance with the disclosed embodiments.

Turning now to the figures, FIG. 1 is a diagram of an exemplary embodiment of a vertical trajectory optimization system 100. As shown, vertical trajectory optimization system 100 generally includes, without limitation, a computing device 102 onboard an aircraft 104 in communication with at least one server 106. The computing device 102 may be implemented using any device which includes at least one processor, some form of computing memory, and input/output (I/O) for transmitting and receiving aircraft performance data onboard the aircraft 104 and atmospheric condition data from the at least one server 106. The computing device 102 may be implemented using a computer system integrated into the aircraft or a personal electronic device. In certain embodiments, the computing device 102 may include the capability of downloading, storing, and executing software applications (i.e., "apps") which include the vertical trajectory optimization functionality described herein. Exemplary embodiments of a computing device 102 may include, without limitation: a laptop computer, a tablet computer, a handheld personal digital assistant, a smartphone, a smartwatch, or other personal electronic device with the capability of communicating with aircraft onboard systems and the at least one server 106.

The computing device 102 may transmit data to, and receive data from, the at least one server 106 via a data communication network 108. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The at least one server 106 may include any number of application servers, and each server may be implemented using any suitable computer. In some embodiments, the at least one server 106 includes one or more dedicated computers. In some embodiments, the at least one server 106 includes one or more computers carrying out other functionality in addition to server operations. In exemplary embodiments, the at least one server 106 stores and provides atmospheric data, which may include, without limitation: temperature, wind speed, wind direction, wind magnitude, turbulence, lightning, and/or other significant atmospheric phenomena which should be avoided by the aircraft 104 in flight.

Prior to flight, or during flight, the computing device 102 uses atmospheric data or weather forecast and performance data associated with the particular aircraft to calculate an optimized and cost-efficient vertical trajectory for an entire air route. In certain embodiments, the computing device 102 first determines the most cost-efficient vertical trajectory for the air route, and then optimizes the cost-efficient vertical trajectory by "smoothing" the vertical trajectory altitude values. The operationally optimized, or in other words, "smoothed" vertical trajectory altitude values represent a more practically implemented vertical trajectory for the air route, which also maintains a lower level of fuel consumption for the aircraft 104 than would be used under normal conditions (e.g., using a flight management system (FMS) generated vertical trajectory which does not consider evolution of atmospheric condition along whole trajectory at once). It should be appreciated that, in other embodiments, the computing device 102 may determine the most cost-efficient vertical trajectory and the optimized cost-efficient vertical trajectory during one combined process. For example, as the computing device 102 calculates each value for the cost-efficient vertical trajectory, the computing device 102 concurrently rejects transitions which do not meet required criteria for the optimized cost-efficient vertical trajectory.

In the particular embodiment shown in FIG. 1, the computing device 102 is located onboard the aircraft 104 and performs the vertical trajectory optimization techniques at this location. However, it should be appreciated that other embodiments of the vertical trajectory optimization system 100 may instead position the computing device 102 at a ground location. In this example, the computing device 102 may receive input and/or requests from the aircraft 104, perform the vertical trajectory optimization functionality, and then transmit optimized vertical trajectory data to the aircraft 104 for use.

Figure 2:
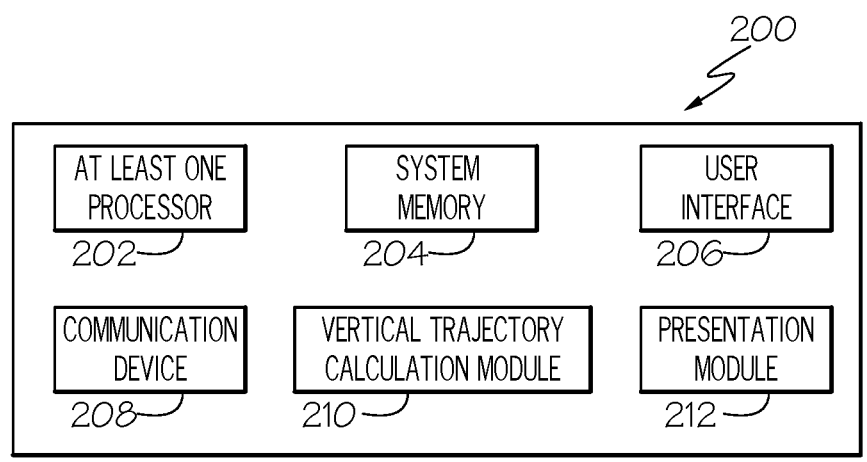
FIG. 2 is a functional block diagram of a computing device suitable for use in a vertical trajectory optimization system, in accordance with the disclosed embodiments.

FIG. 2 is a functional block diagram of a computing device 200 suitable for use in a vertical trajectory optimization system, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a user interface 206; a communication device 208; a vertical trajectory calculation module 210; and a presentation module 212. These elements and features of the computing device 200 may be operatively associated with one another, coupled to one another, or otherwise configured to cooperate with one another as needed to support the desired functionality—in particular, vertical trajectory optimization, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the vertical trajectory optimization techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store a calculated air route data, vertical trajectory data for a particular air route, altitude consistency threshold data, aircraft performance data, atmospheric data associated with particular air routes, or the like.

The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to make menu selections for purposes of viewing available SOP monitoring alerts and notifications indicating SOP compliance or non-compliance of various aircraft onboard systems.

In certain embodiments, the user interface 206 may include or cooperate with various features to allow a user to interact with the computing device 200 via graphical elements rendered on a display element. Accordingly, the user interface 206 may initiate the creation, maintenance, and presentation of a graphical user interface (GUI). In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation, via the user interface 206.

The communication device 208 is suitably configured to communicate data between the computing device 200 and one or more remote servers (see, for example, FIG. 1). As described in more detail below, data received by the communication device 208 may include, without limitation, atmospheric data associated with a particular air route and aircraft performance data associated with the aircraft. Data provided by the communication device 208 may include requests for aircraft performance data, air route data, atmospheric data associated with a particular air route, or the like.

The communication device 208 may transmit and receive communications over a wireless local area network (WLAN), the Internet, a satellite uplink/downlink, a cellular network, a broadband network, a wide area network, or any standard method of aircraft communication. In certain embodiments, the communication device 208 is implemented as an onboard aircraft communication or telematics system. In embodiments wherein the communication device 208 is a telematics module, an internal transceiver may be capable of providing bi-directional mobile phone voice and data communication, implemented as Code Division Multiple Access (CDMA). In some embodiments, other 3G, 4G, and/or 5G technologies may be used to implement the communication device 208, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, Evolved High Speed Packet Access (HSPA+), Long Term Evolution (LTE) and/or Long Term Evolution-Advanced (LTE-A).

The vertical trajectory calculation module 210 is configured to analyze air route data, atmospheric data associated with the air route, and aircraft performance data (obtained via the communication device 208) to calculate cost-efficient altitude values for each distance point throughout the air route. The vertical trajectory calculation module 210 is further configured to optimize the cost-efficient altitude values in order to produce an optimized vertical trajectory for the length of the air route.

The presentation module 212 is configured to operate cooperatively with the user interface 206 to provide a visual representation of an optimized vertical trajectory for an air route. In certain embodiments, the presentation module 212 displays a graphical user interface (GUI) which may include user-selectable options, menus, icons, and/or other graphical elements appropriate to request optimized vertical trajectory data (as determined by the vertical trajectory calculation module 210).

In practice, the vertical trajectory calculation module 210 and/or the presentation module 212 may be implemented with (or cooperate with) the at least one processor 202 to perform at least some of the functions and operations described in more detail herein. In this regard, the vertical trajectory calculation module 210 and/or the presentation module 212 may be realized as suitably written processing logic, application program code, or the like.

Figure 3:
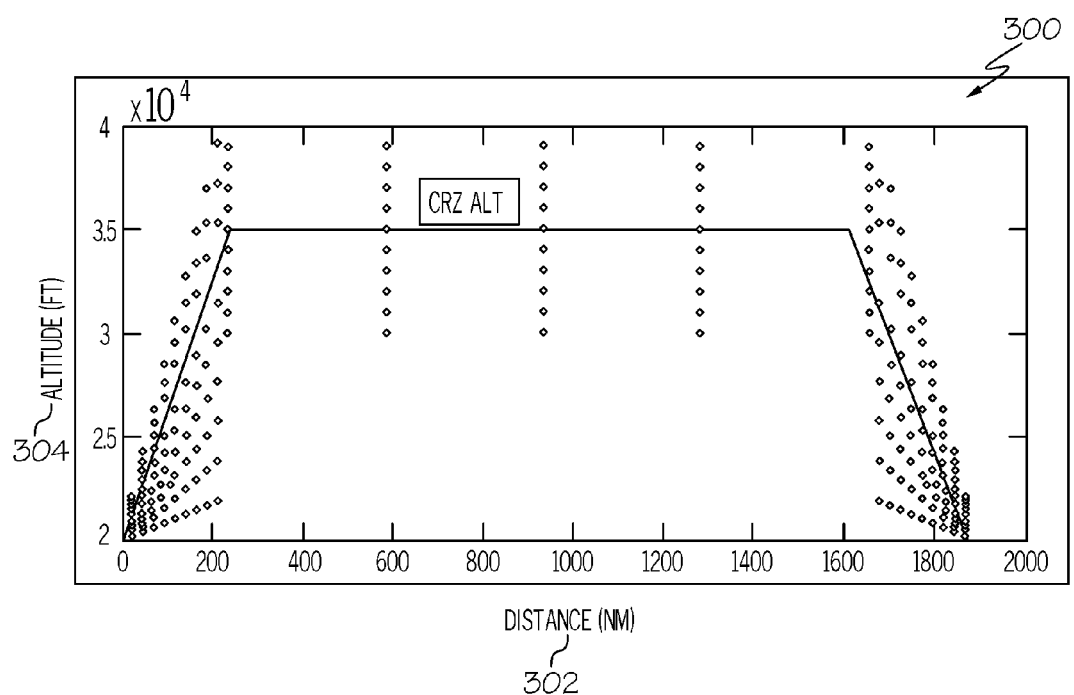
FIG. 3 is a graph illustrating potential altitude values for an air route, in accordance with the disclosed embodiments.

FIG. 3 is a graph 300 illustrating potential altitude values for a particular air route, in accordance with the disclosed embodiments. The graph 300 includes distance values 302 along the x-axis and altitude values 304 along the y-axis, and illustrates the relationship between potential altitude values 304 for each distance value 302 for a particular aircraft traveling the particular air route. It should be appreciated that the depicted distance values and potential altitude values for the air route shown in FIG. 3 represent one exemplary embodiment, and that other air routes may be associated with greater or lesser distance values and/or potential altitude values. Each of the distance values 302 is associated with a plurality of potential altitude values 304. The potential altitude values 304 for one of the distance values 302 are shown as a group of dots above each distance value 302. The dots/potential altitudes can be computed by different algorithms. In this case, the algorithm selects the potential altitudes below and above a nominal/the probable average flight profile based on particular aircraft performance.

The vertical trajectory optimization system (described previously with regard to FIGS. 1-2) is configured to: (i) recognize the group of dots (i.e., the potential altitude values 304) for a particular one of the distance values 302, (ii) compute the cost-efficiency of each of the dots, and (iii) select a particular dot (i.e., altitude value 304) for each of the distance values 302, based on the cost-efficiency of each dot. In certain embodiments, a selected dot may represent the most cost-efficient altitude value available for a particular distance value 302. In some embodiments, however, other factors may be considered, and the selected dot may represent a high level of cost-efficiency (when compared to other levels of cost-efficiency associated with other altitude values 304 for the particular distance value 302), but not necessarily the highest level of cost-efficiency. Here, no constraints are taken into consideration, aside from cost-efficiency, to generate the most cost-efficient vertical trajectory within operational limitations of the aircraft. The algorithm evaluates the cost function of effectively all of the feasible vertical trajectories and selects the most cost-efficient. Collectively, the group of selected, particular dots extends from the beginning point of the air route to the endpoint of the air route, and represent a cost-efficient vertical trajectory for the air route, as shown in FIG. 4.

Figure 4:
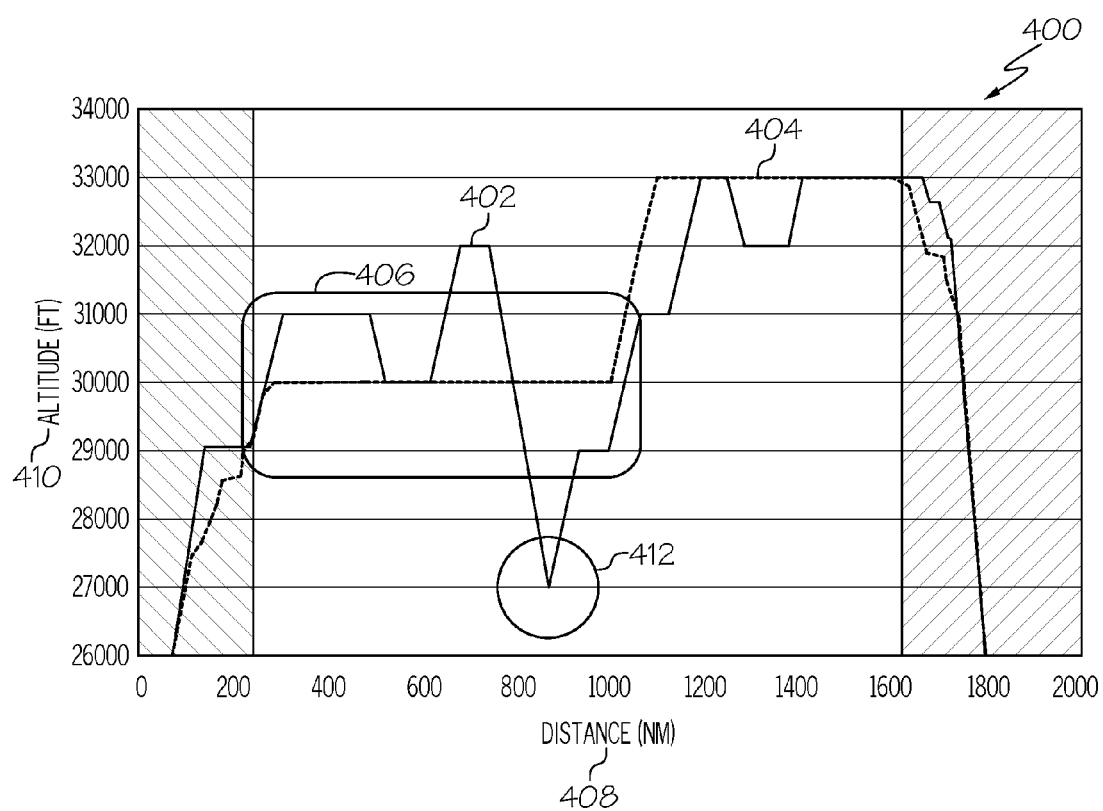
FIG. 4 is a graph that includes a plot for a cost-efficient vertical trajectory and an optimized cost-efficient vertical trajectory, in accordance with the disclosed embodiments.

FIG. 4 is a graph 400 that includes a plot for a cost-efficient vertical trajectory 402 and an optimized cost-efficient vertical trajectory 404, applicable to a particular air route, a particular aircraft, under particular atmospheric conditions. The graph 400 includes distance values 408 along the x-axis and altitude values 410 along the y-axis, and illustrates the relationship between applicable altitude values 410 for each distance value 408 for a particular air route, when calculated for the cost-efficient vertical trajectory 402 and the optimized cost-efficient vertical trajectory 404.

The cost-efficient vertical trajectory 402 is computed as described with regard to FIG. 3. The vertical trajectory optimization system (described previously with regard to FIGS. 1-2) "optimizes" the cost-efficient vertical trajectory 402, at each altitude point, to create the optimized cost-efficient vertical trajectory 404, which is a more practically-implemented vertical trajectory, and which also reduces fuel consumption of the aircraft. Because computation of the cost-efficient vertical trajectory 402 considers fuel economy without regard for other factors (such as aviation best practices, flight crew and/or passenger comfort, or the like), the vertical trajectory optimization system adjusts the cost-efficient altitude values for other factors to produce the optimized cost-efficient vertical trajectory 404.

In certain embodiments, the cost-efficient vertical trajectory 402 is adjusted to ensure that each altitude value is maintained for a time period threshold prior to transition to another altitude value. In some embodiments, the cost-efficient vertical trajectory 402 is adjusted to ensure that each altitude value is maintained for a distance value threshold prior to transition to another altitude value. This "smoothing" of the cost-efficient vertical trajectory 402 is shown in area 406, where the optimized cost-efficient vertical trajectory 404 maintains a consistent altitude value, while the cost-efficient vertical trajectory 402 changes altitude several times.

Adjustments may also be made to the cost-efficient vertical trajectory 402 to ensure that drastic maneuvers are not recommended in the optimized cost-efficient vertical trajectory 404. For example, as shown in area 412, the cost-efficient vertical trajectory 402 descends to 27,000 ft., and then immediately climbs to 29,000 ft. In certain embodiments, the vertical trajectory optimization system may remove this descent and immediate climb to present a more consistent recommended altitude, as shown by the optimized cost-efficient vertical trajectory 404.

In some embodiments, the cost-efficient vertical trajectory 402 is calculated and then optimized as a whole. However, in some embodiments, the cost-efficient vertical trajectory 402 is calculated point-by-point, and optimizes each point as it is calculated to produce a single, optimized, cost-efficient vertical trajectory 404.

Figure 5:
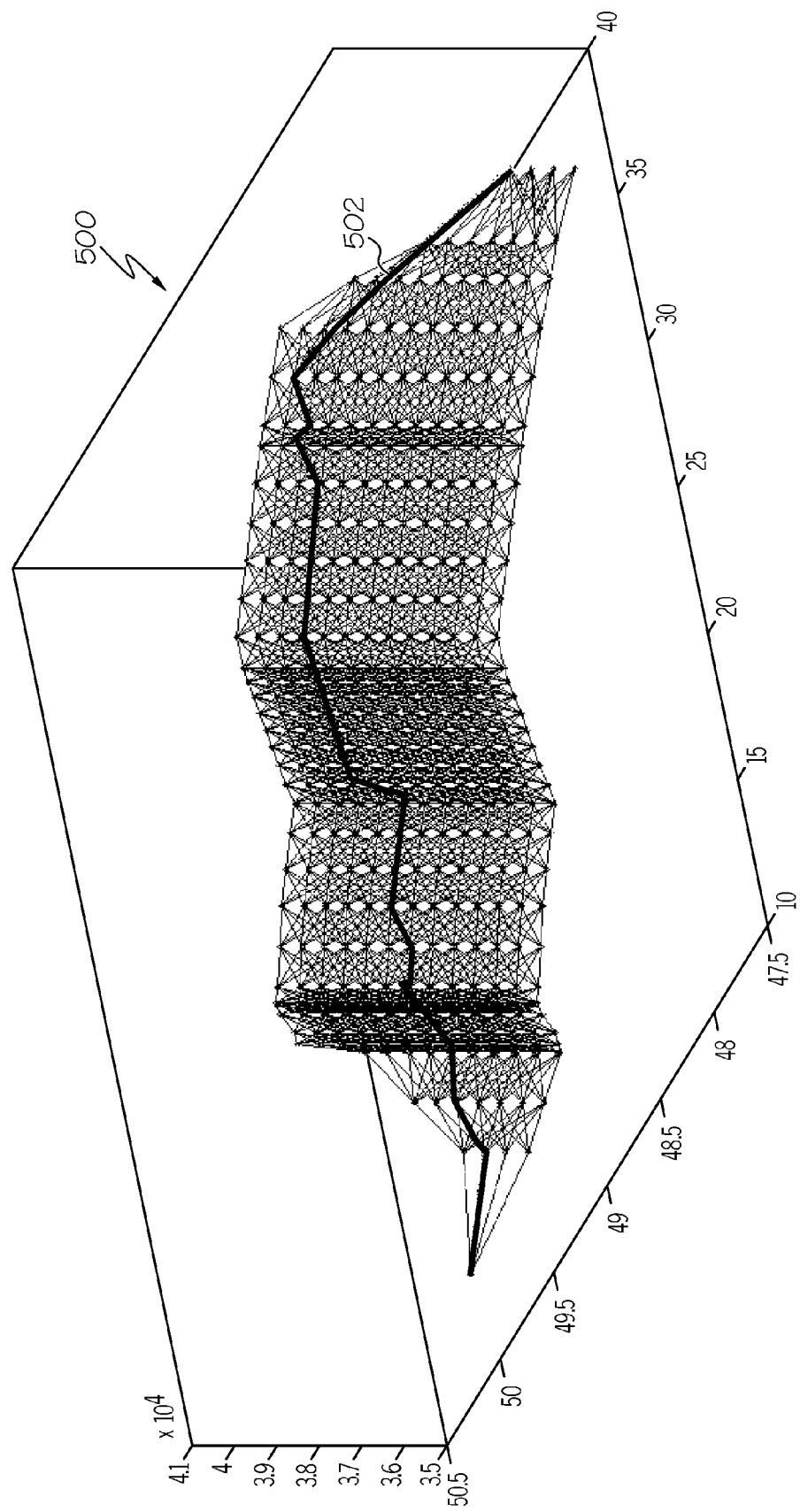
FIG. 5 is a three-dimensional (3D) graph illustrating potential altitude values for an air route, and an optimized cost-efficient vertical trajectory, in accordance with the disclosed embodiments.

FIG. 5 is a three-dimensional (3D) graph 500 illustrating potential altitude values for an air route, and an optimized cost-efficient vertical trajectory, in accordance with the disclosed embodiments. As shown, the evaluated 3D graph 500 displays a lateral path 502 which is representative of an optimized cost-efficient vertical trajectory. Here, the 3D graph 500 includes a plurality of dots connected by lines. Each dot represents a potential location through which the plane can fly, and the lines represent enabled paths from one dot to another. Together, the dots and lines represent an oriented graph, and an aircraft can fly from a column at certain altitude to n-different altitudes in the next column. Evaluation of potential altitude values, to determine cost-efficient altitude values and/or optimized cost-efficient altitude values, proceeds column by column. Each column includes the potential altitude values (i.e., potential points) for aircraft travel, when the aircraft has traveled through a determined previous point in the previous column. Evaluation of a particular, current point considers this previous point, which represents an optimized cost-efficient altitude for the previous column. From any point (i.e., altitude value) through its previous points, it is possible to locate a lateral path to the beginning of the graph, wherein the lateral path represents the optimal path, or in other words, the optimized cost-efficient vertical trajectory. Optimal path can be very "peaky" and might need smoothing.

Determining cost-efficient altitude values and/or optimized cost-efficient altitude values may be accomplished using one or more techniques. As a first technique, operational limits may be implemented directly in the column-by-column graph evaluation, to produce an optimized cost-efficient vertical trajectory in a point-by-point manner. As a second technique, a cost-efficient vertical trajectory for the air route may be calculated first, and then post-processing procedures may be used to "smooth" or optimize the cost-efficient vertical trajectory to produce an optimized cost-efficient vertical trajectory for the air route.

Figure 6:
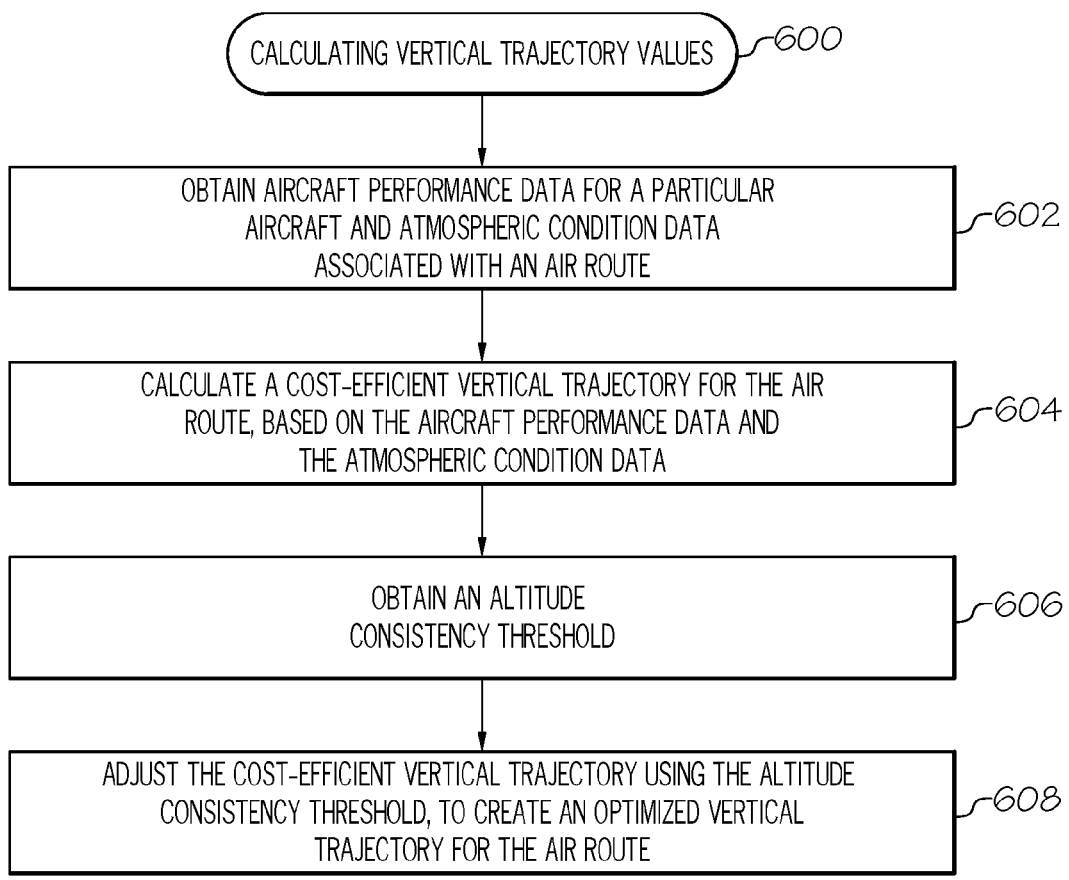
FIG. 6 is a flow chart that illustrates an embodiment of a process for calculating vertical trajectory values.

FIG. 6 is a flow chart that illustrates an embodiment of a process 600 for calculating vertical trajectory values. The various tasks performed in connection with process 600 may be performed by software, hardware, firmware, or any combination thereof. For illustrative purposes, the following description of process 600 may refer to elements mentioned above in connection with FIGS. 1-5. In practice, portions of process 600 may be performed by different elements of the described system. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

For ease of description and clarity, this example assumes that the process 600 begins by obtaining aircraft performance data for a particular aircraft and atmospheric condition data associated with an air route (step 602). Aircraft performance data refers to aircraft-specific modeling and operational parameters, which may include, without limitation: engine data, angle of attack, fuel consumption for a given altitude, thrust, data provided by the aircraft manufacturer, and the like. Atmospheric data refers to weather conditions at a particular distance location and altitude for a particular air route, and may include, without limitation: air temperature, wind speed, wind direction, air pressure, lightning, turbulence, and/or other atmospheric conditions that should be avoided by an in-flight aircraft.

Next, the process 600 calculates a cost-efficient vertical trajectory for the air route, based on the aircraft performance data and the atmospheric condition data (step 604). One suitable methodology for calculating the cost-efficient vertical trajectory is described below with reference to FIG. 7. As described previously with regard to FIGS. 3-5, the process 600 computes altitude values for a particular aircraft to use, for a particular air route, to reduce fuel consumption of the aircraft. Here, no constraints are taken into consideration, aside from cost-efficiency, to generate the most cost-efficient vertical trajectory within operational limitations of the aircraft. The process 600 evaluates the cost function of effectively all of the feasible vertical trajectories and selects the most cost-efficient.

The process 600 then receives an altitude consistency threshold (step 606). The altitude consistency threshold is a time value or distance value for which the aircraft is configured to remain at a particular altitude. For example, an altitude consistency threshold of one hour indicates that, for a particular air route, an aircraft remains at a current altitude for a minimum time period of one hour, prior to making a transition to a different altitude. As another example, an altitude consistency threshold of 200 nautical miles (NM) indicates that, while traveling the air route, the aircraft remains at a current altitude for a minimum distance of 200 NM, prior to making a transition to a different altitude.

In certain embodiments, the altitude consistency threshold is a user-configurable value. In this situation, a user provides the altitude consistency threshold via user interface. In some embodiments, however, the altitude consistency threshold may be a preconfigured value associated with a particular type of aircraft, a particular air route, and/or particular atmospheric conditions.

Next, the process 600 adjusts the cost-efficient vertical trajectory using the altitude consistency threshold, to generate an optimized vertical trajectory for the air route (step 608). One suitable methodology for adjusting the cost-efficient vertical trajectory using the altitude consistency threshold is described below with reference to FIG. 8. In step 604, the process 600 calculated a cost-efficient vertical trajectory based on the aircraft performance data and atmospheric data associated with the air route. However, the process 600 does not consider the practical limitations of flight, which may include aviation best practices and the comfort and preferences of flight crew members and passengers onboard the aircraft. In step 608, the process 600 considers these factors by using the altitude consistency threshold to adjust the calculated, cost-efficient vertical trajectory into an "optimized" vertical trajectory that considers cost-efficiency and also maintains each altitude level for at least the altitude consistency threshold value.

Figure 7:
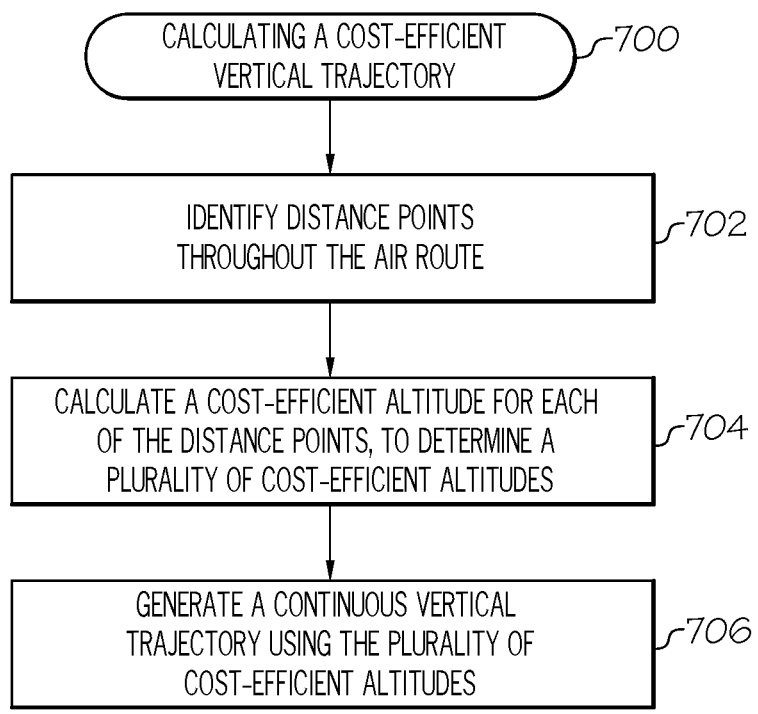
FIG. 7 is a flow chart that illustrates an embodiment of a process for calculating a cost-efficient vertical trajectory.

FIG. 7 is a flow chart that illustrates an embodiment of a process 700 for calculating a cost-efficient vertical trajectory. It should be appreciated that the process 700 described in FIG. 7 represents one embodiment of step 604 described above in the discussion of FIG. 6, including additional detail. First, the process 700 identifies distance points throughout the air route (step 702). As shown in FIG. 3, an air route extends from a beginning point to an endpoint, and distance points may identify increments of this air route.

Next, the process 700 calculates a cost-efficient altitude for each of the distance points, to determine a plurality of cost-efficient altitudes (step 704). Each cost-efficient altitude value is calculated based on performance data for the particular aircraft and/or type of aircraft, and atmospheric and weather data for the particular distance point of the air route. Altitude values are selected based on expert knowledge. The selection of appropriate altitude values on grid can be subject to adaptation during flight as an output of the process 700 as executed in real-time. The process 700 may use certain criteria to identify each of the altitude values. For example, during cruise phase the process 700 recognizes that it is counterintuitive to evaluate altitude values below 50 Nautical Miles (NM) and above 500 NM. During climb and descent, the process 700 recognizes that the altitudes are closely connected with ability of aircraft climb or descent (+/−5 degrees). The process 700 calculates a cost-efficient altitude from current location or destination incrementally. The process 700 begins with the first incremental distance from a current altitude or destination altitude, and calculates the costs of transitions to all available altitudes. As the aircraft moves forward during flight of an air route, the aircraft reaches the next distance point in sequence, and all of the possible transitions including operational limitations (i.e. fulfillment of distance threshold, condition against sharp transition) are calculated again, but only the most cost-efficient operationally feasible transitions to the altitudes are stored. The process 700 repeats until the final destination or current position is reached.

The process 700 then generates a continuous vertical trajectory using the plurality of cost-efficient altitudes (step 706). The continuous vertical trajectory indicates a vertical flight path for the aircraft to follow while traveling the air route, and extends from the beginning point of the air route to the endpoint of the air route.

Figure 8:
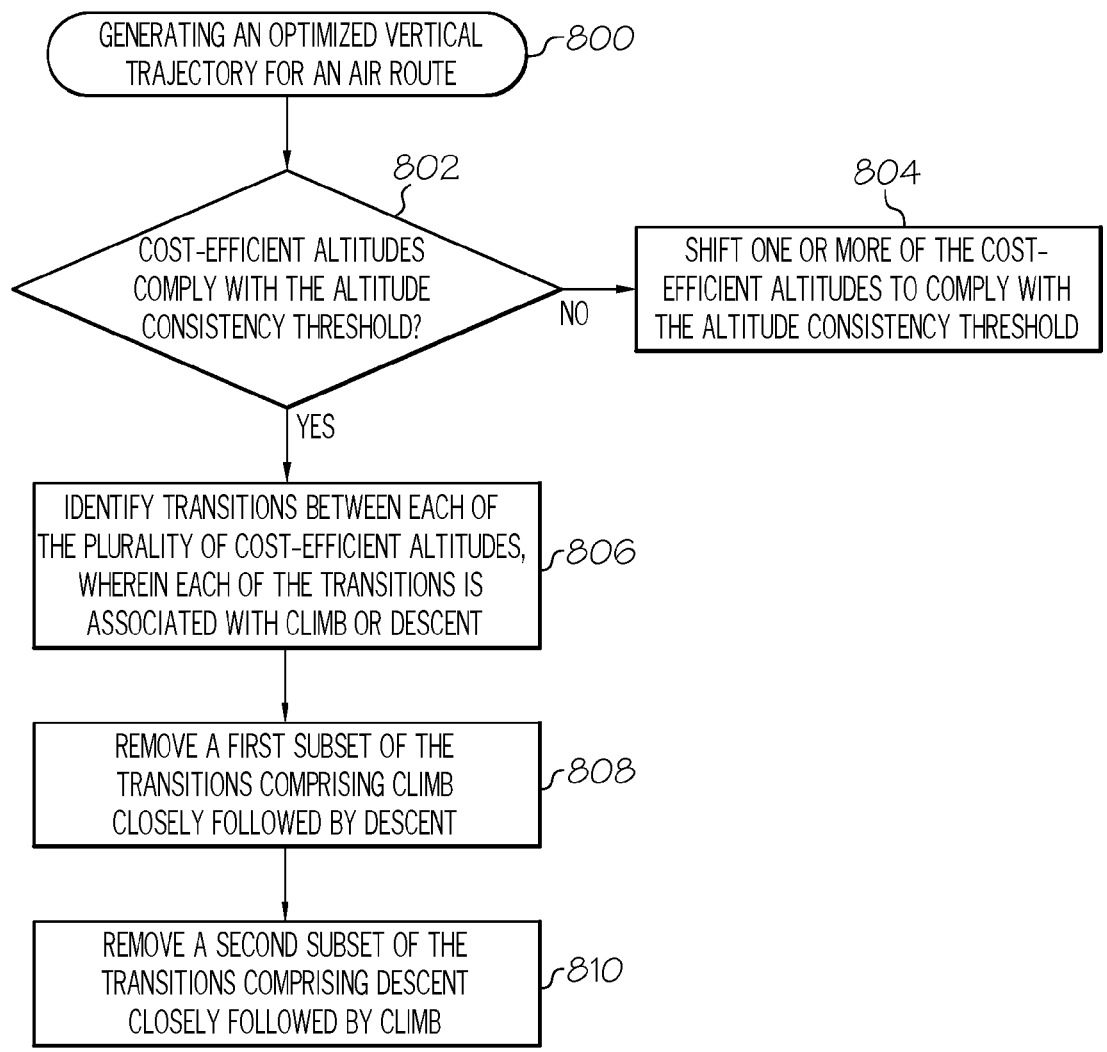
FIG. 8 is a flow chart that illustrates an embodiment of a process for generating an optimized vertical trajectory for an air route.

FIG. 8 is a flow chart that illustrates an embodiment of a process 700 for generating an optimized vertical trajectory for an air route. It should be appreciated that the process 800 described in FIG. 8 represents one embodiment of step 608 described above in the discussion of FIG. 6, including additional detail. First, the process 800 determines whether a plurality of cost-efficient altitudes (described previously with regard to FIGS. 6 and 7) comply with an altitude consistency threshold (decision 802). Here, the process 800 analyzes groups of the cost-efficient altitudes to identify areas that do not maintain a consistent altitude value that meets the altitude consistency threshold. The process 800 permits a transition from a first altitude value to a second altitude value only when the first altitude value has been maintained for at least the amount of time or distance represented by the altitude consistency threshold.

When the process 800 determines that the plurality of cost-efficient altitudes does not comply with the altitude consistency threshold (the "No" branch of 802), then the process 800 shifts one or more of the cost-efficient altitudes to comply with the altitude consistency threshold (step 804). For example, here the process 800 identifies a first cost-efficient altitude value that is different than a previous, second cost-efficient altitude value that is associated with an earlier time during travel of the air route, or is associated with a shorter distance from the beginning point of the air route. In this case, the process 800 determines whether the cost-efficient altitude values maintained the same altitude level represented by the second cost-efficient altitude value for the minimum duration represented by the altitude consistency threshold.

When the process 800 determines that the plurality of cost-efficient altitudes complies with the altitude consistency threshold (the "Yes" branch of 802), then the process 800 makes no changes to the plurality of cost-efficient altitudes and continues by identifying transitions between each of the plurality of cost-efficient altitudes, wherein each of the transitions is associated with a climb or descent (step 806).

Next, the process 800 removes a first subset of the transitions comprising climb closely followed by descent (step 808), and then removes a second subset of the transitions comprising descent closely followed by climb (step 810). Here, the altitude values surrounding the transitions identified in steps 808-810 are removed from the vertical trajectory, and the vertical trajectory is completed using the remaining altitude values. The process 800 checks the orientation of transitions at the following incremental distance during calculation. If the orientation of the following transition is opposite "+→−" (climb followed by descent) or "−→+" (descent followed by climb), then the transition is discarded.

Figure 9:
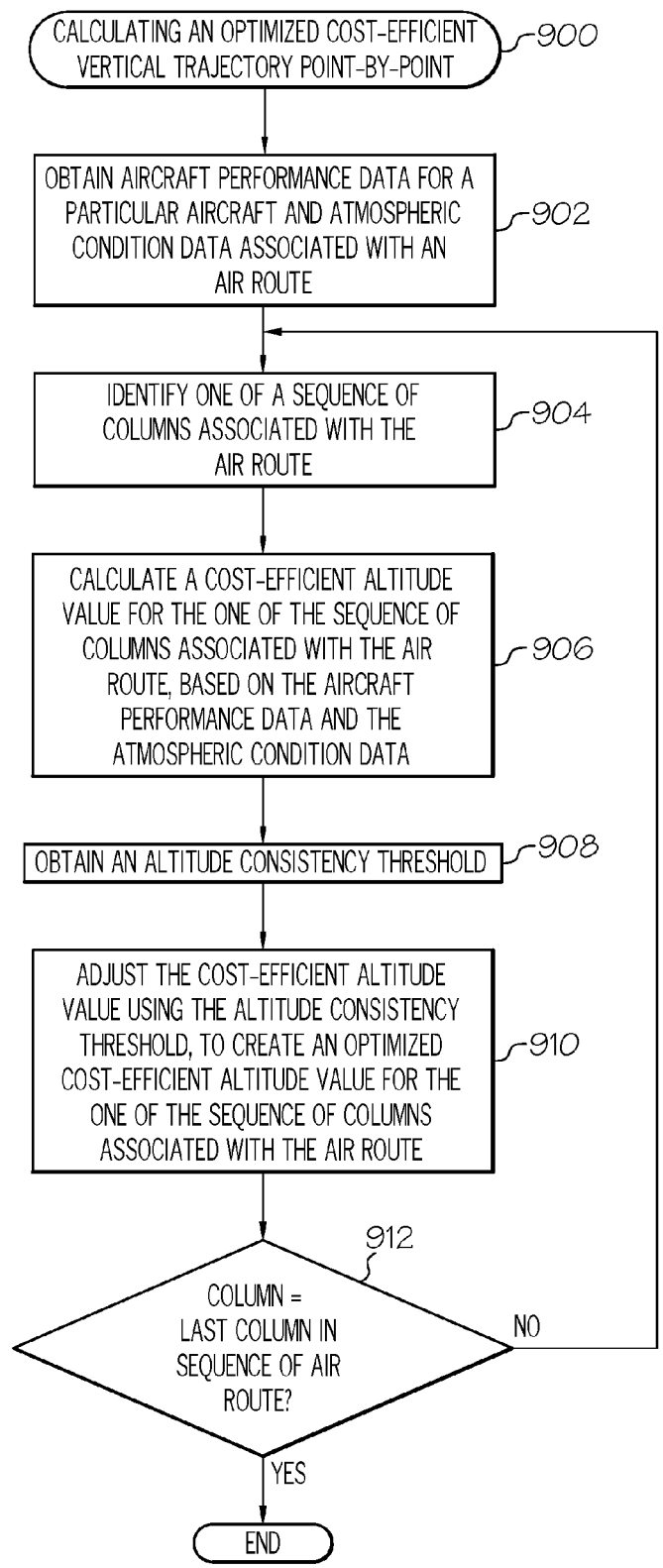
FIG. 9 is a flow chart that illustrates an embodiment of a process for calculating an optimized cost-efficient vertical trajectory on a point-by-point basis.

FIG. 9 is a flow chart that illustrates an embodiment of a process 900 for calculating an optimized cost-efficient vertical trajectory on a point-by-point basis. It should be appreciated that the process 900 further describes the second technique for calculating an optimized cost-efficient vertical trajectory, as described previously with regard to FIG. 5. First, the process 900 obtains aircraft performance data for a particular aircraft and atmospheric condition data associated with an air route (step 902). This step was described previously (see FIG. 6, step 602), and will not be redundantly described here. The process 900 then identifies one of a sequence of columns associated with the air route (step 904). The air route may include any number of columns, wherein each column is identified by an incremental distance point on the air route (see FIG. 7, step 702), and includes the potential altitude values for the applicable distance point. Here, the process 900 is performing an evaluation of the potential altitude values for a particular column in the sequence, and thus identifies one column at a time.

The process 900 then calculates a cost-efficient altitude value for the one of the sequence of columns associated with the air route, based on the aircraft performance data and the atmospheric condition data (step 906). One suitable methodology for calculating the cost-efficient vertical trajectory is described previously with reference to FIG. 7. As described previously with regard to FIGS. 3-5, the process 900 computes a cost-efficient altitude value for a particular aircraft to use, for a particular air route, to reduce fuel consumption of the aircraft. Here, no constraints are taken into consideration, aside from cost-efficiency, to generate the most cost-efficient altitude value within operational limitations of the aircraft. The process 900 evaluates the cost function of effectively all of the feasible altitude values and selects the most cost-efficient.

The process 900 then obtains an altitude consistency threshold (step 908). The altitude consistency threshold is a time value or distance value for which the aircraft is configured to remain at a particular altitude. For example, an altitude consistency threshold of one hour indicates that, for a particular air route, an aircraft remains at a current altitude for a minimum time period of one hour, prior to making a transition to a different altitude. As another example, an altitude consistency threshold of 200 nautical miles (NM) indicates that, while traveling the air route, the aircraft remains at a current altitude for a minimum distance of 200 NM, prior to making a transition to a different altitude. In certain embodiments, the altitude consistency threshold is a user-configurable value. In this situation, a user provides the altitude consistency threshold via user interface. In some embodiments, however, the altitude consistency threshold may be a preconfigured value associated with a particular type of aircraft, a particular air route, and/or particular atmospheric conditions.

Next, the process 900 adjusts the cost-efficient altitude value using the altitude consistency threshold, to generate an optimized cost-efficient altitude value for the air route (step 910). One suitable methodology for adjusting the cost-efficient vertical trajectory using the altitude consistency threshold is described previously with reference to FIG. 8. In step 906, the process 900 calculated a cost-efficient altitude value based on the aircraft performance data and atmospheric data associated with the air route. However, the process 900 does not consider the practical limitations of flight, which may include aviation best practices and the comfort and preferences of flight crew members and passengers onboard the aircraft. In step 910, the process 900 considers these factors by using the altitude consistency threshold to adjust the calculated, cost-efficient altitude value into an "optimized" altitude value that considers cost-efficiency and also maintains each altitude level for at least the altitude consistency threshold value.

After adjusting the cost-efficient altitude value to create an optimized cost-efficient altitude value (step 910), the process 900 determines whether the currently-evaluated column is the last (i.e., final) column in the sequence of columns associated with the air route (decision 912). If the optimized cost-efficient altitude value has been calculated for the final column in the sequence of columns for the air route (the "Yes" branch of 912), then the process 900 has completed the point-by-point calculation of optimized cost-efficient altitude values for the air route, and the process 900 ends. However, if the optimized cost-efficient altitude value has been calculated for a column other than the final column of the sequence of columns for the air route (the "No" branch of 912), then the process 900 returns to the beginning to identify the next column in the sequence of columns at step 904, and to perform the calculations again. The process 900 continues in this manner, to determine an optimized cost-efficient altitude value for each column of the air route, and ends when a complete, optimized cost-efficient vertical trajectory for the air route has been calculated.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for calculating vertical trajectory values, the method comprising:
    obtaining aircraft performance data for a particular aircraft and atmospheric condition data associated with an air route;
    calculating a cost-efficient vertical trajectory for the air route, based on the aircraft performance data and the atmospheric condition data, wherein the cost-efficient vertical trajectory comprises a plurality of altitude values for minimizing cost for the particular aircraft during travel of the air route;
    obtaining an altitude consistency threshold comprising a time period or a distance value for which the particular aircraft is configured to remain at a particular altitude; and
    adjusting the cost-efficient vertical trajectory using the altitude consistency threshold, to create an optimized vertical trajectory for the aircraft route, by:
        when one or more of the plurality of altitudes do not comply with the altitude consistency threshold, shifting the one or more of the plurality of altitudes to comply with the altitude consistency threshold; and
        when the plurality of altitudes do comply with the altitude consistency threshold,
            identifying transitions between each of the plurality of altitude values;
            removing a first subset of the transitions comprising climb followed by descent; and
            removing a second subset of the transitions comprising descent followed by climb.

2. The method of claim 1, wherein the altitude consistency threshold comprises a time period; and
    wherein adjusting the cost-efficient vertical trajectory further comprises maintaining each of the plurality of altitude values for at least the time period.

3. The method of claim 1, wherein the altitude consistency threshold comprises a time period; and wherein adjusting the cost-efficient vertical trajectory further comprises permitting a transition from a first one of the plurality of altitude values to a second one of the plurality of altitude values after the first one of the plurality of altitude values has been maintained for at least the time period.

4. The method of claim 1, wherein the altitude consistency threshold comprises a distance value; and
wherein adjusting the cost-efficient vertical trajectory further comprises maintaining each of the plurality of altitude values for at least the distance value.

5. The method of claim 1, wherein the altitude consistency threshold comprises a distance value; and
wherein adjusting the cost-efficient vertical trajectory further comprises permitting a transition from a first one of the plurality of altitude values to a second one of the plurality of altitude values after the first one of the plurality of altitude values has been maintained for at least the distance value.

6. The method of claim 1, wherein calculating a cost-efficient vertical trajectory for the air route further comprises:
identifying distance points throughout the air route; and
calculating a cost-efficient altitude for each of the distance points to generate a plurality of cost-efficient altitudes, wherein the plurality of altitude values comprises the plurality of cost-efficient altitudes.

7. A system for calculating vertical trajectory values, the system comprising:
a system memory element;
a communication device, configured to receive atmospheric condition data associated with an air route; and
at least one processor communicatively coupled to the system memory element and the communication device, the at least one processor configured to:
calculate a cost-efficient vertical trajectory for the air route, based on the aircraft performance data and the atmospheric condition data, wherein the cost-efficient vertical trajectory comprises a plurality of altitude values for minimizing cost for the particular aircraft during travel of the air route; and
adjust the cost-efficient vertical trajectory using an altitude consistency threshold comprising a time value or a distance value for which the particular aircraft is configured to remain at a particular altitude, to generate an optimized vertical trajectory for the aircraft route, by:
when one or more of the plurality of altitudes do not comply with the altitude consistency threshold, shifting the one or more of the plurality of altitudes to comply with the altitude consistency threshold; and
when the plurality of altitudes do comply with the altitude consistency threshold,
identifying transitions between each of the plurality of altitude values:
removing a first subset of the transitions comprising climb followed by descent; and
removing a second subset of the transitions comprising descent followed by climb.

8. The system of claim 7, further comprising a user interface communicatively coupled to the at least one processor, the user interface configured to:
receive user input comprising the altitude consistency threshold; and
transmit the altitude consistency threshold to the at least one processor.

9. The system of claim 7, wherein the at least one processor is further configured to communicate with the system memory element to obtain the altitude consistency threshold.

10. The system of claim 7, wherein the altitude consistency threshold comprises a time period; and
wherein adjusting the cost-efficient vertical trajectory further comprises maintaining each of the plurality of altitude values for at least the time period.

11. The system of claim 7, wherein the altitude consistency threshold comprises a distance value; and
wherein adjusting the cost-efficient vertical trajectory further comprises maintaining each of the plurality of altitude values for at least the distance value.

12. The system of claim 7, wherein the at least one processor is further configured to:
identify distance points throughout the air route; and
calculate a cost-efficient altitude for each distance point to generate a plurality of cost-efficient altitudes, wherein the plurality of altitude values comprises the plurality of cost-efficient altitudes.

13. A non-transitory, computer-readable medium containing instructions thereon, which, when executed by a processor, perform a method comprising:
identifying distance points throughout an air route;
calculating a cost-efficient altitude for each of the distance points to determine a plurality of cost-efficient altitudes, wherein the plurality of cost-efficient altitudes is applicable to a particular aircraft traveling the air route;
determining whether each of the plurality of cost-efficient altitudes complies with an altitude consistency threshold comprising a time value or a distance value for which the particular aircraft is configured to remain at a particular altitude; and
creating an optimized vertical trajectory, by:
when one or more of the plurality of cost-efficient altitudes does not comply with the altitude consistency threshold, shifting the one or more of the plurality of cost-efficient altitudes to comply with the altitude consistency threshold; and
when the plurality of altitudes do comply with the altitude consistency threshold, identifying transitions between each of the plurality of altitude values;
removing a first subset of the transitions comprising climb followed by descent; and
removing a second subset of the transitions comprising descent followed by climb.

14. The non-transitory, computer-readable medium of claim 13, wherein the altitude consistency threshold comprises a time period; and
wherein shifting the one of the plurality of cost-efficient altitudes further comprises maintaining a value for each of the plurality of cost-efficient altitudes for at least the time period.

15. The non-transitory, computer-readable medium of claim 13, wherein the altitude consistency threshold comprises a distance value; and
wherein shifting the one of the plurality of cost-efficient altitudes further comprises maintaining a value for each of the plurality of cost-efficient altitudes for at least the distance value.

* * * * *